US011072064B2

(12) United States Patent
Alotaibi

(10) Patent No.: US 11,072,064 B2
(45) Date of Patent: Jul. 27, 2021

(54) INTERCEPTING DEVICE

(71) Applicant: Majed Jari Alotaibi, Nashville, TN (US)

(72) Inventor: Majed Jari Alotaibi, Nashville, TN (US)

( * ) Notice: Subject to any disclaimer, the term of this patent is extended or adjusted under 35 U.S.C. 154(b) by 276 days.

(21) Appl. No.: 15/805,814

(22) Filed: Nov. 7, 2017

(65) Prior Publication Data

US 2019/0134808 A1 May 9, 2019

(51) Int. Cl.

| | |
|---|---|
| ***B25J 5/00*** | (2006.01) |
| ***H04N 1/024*** | (2006.01) |
| ***B25J 11/00*** | (2006.01) |
| ***B25J 9/14*** | (2006.01) |
| ***B25J 9/16*** | (2006.01) |
| ***H04N 7/18*** | (2006.01) |
| ***H04R 1/02*** | (2006.01) |

(52) U.S. Cl.

CPC ................ *B25J 5/007* (2013.01); *B25J 9/14* (2013.01); *B25J 9/1679* (2013.01); *B25J 11/00* (2013.01); *H04N 1/0249* (2013.01); *H04N 7/185* (2013.01); *H04N 2201/0081* (2013.01); *H04R 1/028* (2013.01); *H04R 2499/13* (2013.01); *Y10S 901/01* (2013.01); *Y10S 901/22* (2013.01); *Y10S 901/44* (2013.01)

(58) Field of Classification Search

CPC ... B25J 5/007; B25J 9/14; B25J 9/1679; B25J 11/00; H04N 1/0249; H04N 7/185; H04N 2201/0081; H04R 1/028; H04R 2499/13; Y10S 901/01; Y10S 901/22; Y10S 901/44

See application file for complete search history.

(56) References Cited

U.S. PATENT DOCUMENTS 6,113,343 A * 9/2000 Goldenberg ............. B25J 5/005 239/587.2
6,369,849 B1 4/2002 Rzyski
7,011,171 B1 * 3/2006 Poulter ................. B60B 15/023 180/65.1
7,464,775 B2 * 12/2008 Clemens ............. B60K 7/0007 180/8.1
7,642,899 B2 * 1/2010 Alvarado .............. B62D 41/00 340/425.5
7,896,113 B1 * 3/2011 Ramirez ................. B25J 5/005 180/9

(Continued)

OTHER PUBLICATIONS

"DC3 Police in-Car Camera System", Martel Electronics, http://www.martelelectronics.com/dc3-police-in-car-camera-system/, Jul. 3, 2017, 5 pages.

*Primary Examiner* — Nicholas Kiswanto

(57) ABSTRACT

An intercepting device to inspect a driver including a chassis, an arm mounted on the chassis and articulable between a contracted position and a deployed position, a head assembly mounted on the arm assembly with a camera, a microphone, and a scanner that provides output image, sound, and scan signals commensurate with images, sounds, and documents of the driver, and an electronic control unit operatively coupled to the arm assembly, and the head assembly, and configured to send to the arm actuation signals to articulate the arm from the contracted position to the deployed position, and receive and transmit the output image, sound, and scan signals to a law enforcement electronic device.

18 Claims, 11 Drawing Sheets

(56) References Cited

U.S. PATENT DOCUMENTS

| | | | | |
|---|---|---|---|---|
| 8,678,121 | B2 * | 3/2014 | Troy | B62D 63/04 180/167 |
| 8,771,085 | B1 | 7/2014 | Clyde et al. | |
| 9,770,825 | B2 * | 9/2017 | Goldenberg | B62D 55/26 |
| 9,804,577 | B1 * | 10/2017 | Troy | G01N 29/225 |
| 10,207,411 | B2 * | 2/2019 | Michalakis | B60S 5/02 |
| 2003/0231118 | A1 | 12/2003 | Kitson | |
| 2007/0030350 | A1 * | 2/2007 | Wagner | H04N 7/185 348/148 |
| 2012/0243335 | A1 | 9/2012 | Spencer et al. | |

* cited by examiner

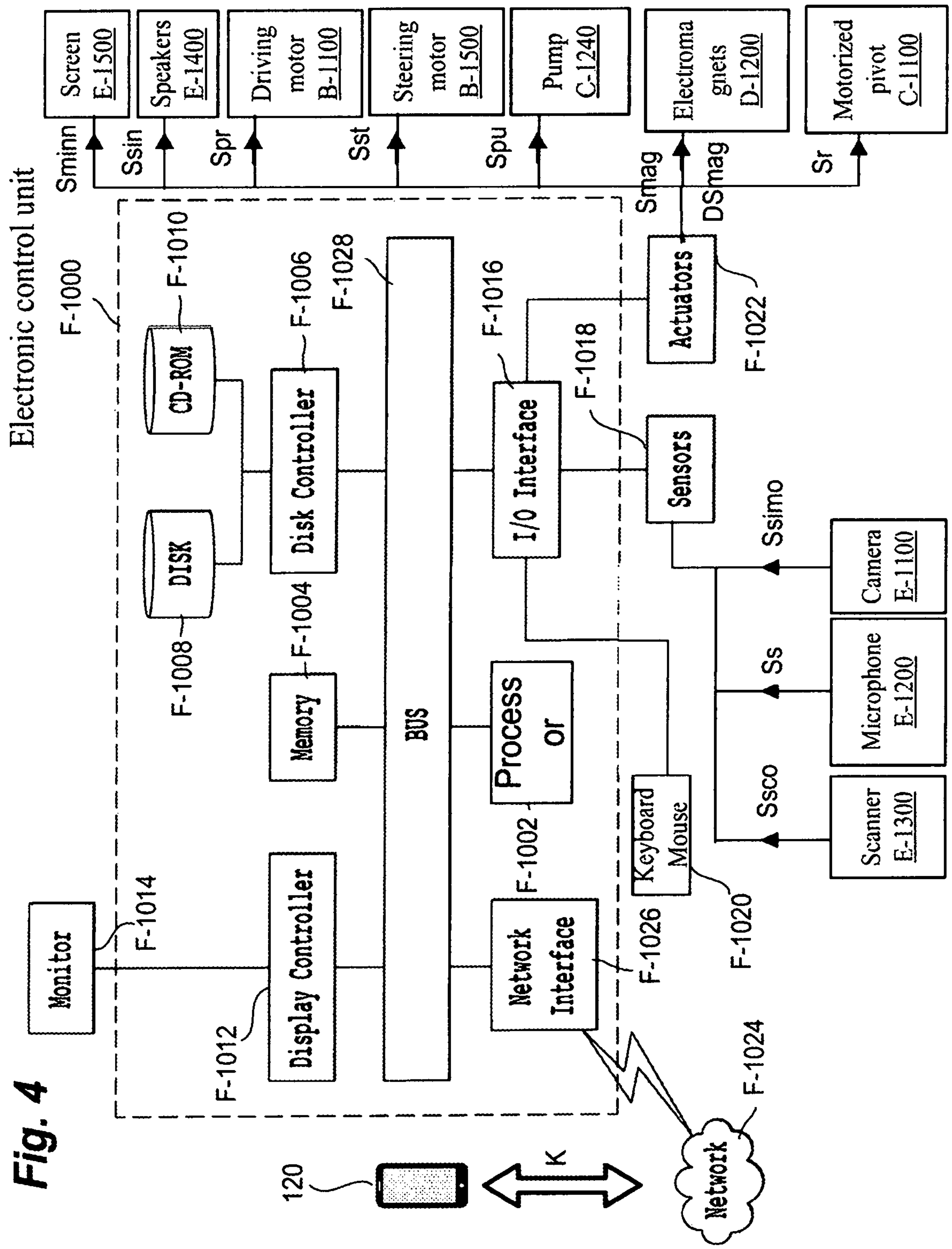

Fig. 4
Electronic control unit
F-1000
Screen E-1500
Speakers E-1400
Driving motor B-1100
Steering motor B-1500
Pump C-1240
Electromagnets D-1200
Motorized pivot C-1100
Sminn
Ssin
Spr
Sst
Spu
Smag
DSmag
Sr
CD-ROM
F-1010
DISK
F-1008
Disk Controller
F-1006
F-1028
Memory
F-1004
BUS
Processor
F-1002
I/O Interface
F-1016
F-1018
Actuators
F-1022
Sensors
Ssimo
Ss
Ssco
Camera E-1100
Microphone E-1200
Scanner E-1300
Keyboard Mouse
F-1020
Monitor
F-1014
Display Controller
F-1012
Network Interface
F-1026
Network
F-1024
K
120

INTERCEPTING DEVICE

BACKGROUND

Grant of Non-exclusive Right

This application was prepared with financial support from the Saudi Arabian Cultural Mission, and in consideration therefore the present inventor(s) has granted The Kingdom of Saudi Arabia a non-exclusive right to practice the present invention.

Field of the Disclosure

The present disclosure relates to law enforcement devices and notably to devices for intercepting vehicles.

Description of the Related Art

Intercepting vehicles to control drivers is an important day-to-day task performed by law enforcement and/or security personnel.

However, such a task of intercepting vehicles and controlling drivers can be difficult and dangerous for the law enforcement personnel, the drivers, as well as civilians that may be present in the surrounding area where the interception is taking place.

To this end, conventional law enforcement equipment that protects law enforcement personnel from injuries, such as bulletproof vests or other kind of body armors, or that slows down the progression of vehicles to be intercepted, such as road barriers or speed bumps are employed. Although such conventional law enforcement equipment is employed, they present important drawbacks. Notably, this conventional law enforcement equipment provides limited efficiency as they require the law enforcement personnel to be in contact or in close distance with the drivers and or the vehicles to be intercepted or can be impracticable in highly dense traffic conditions.

Thus, an intercepting device that solves the aforementioned limitations of safety and efficiency is desired.

SUMMARY

Accordingly, one object of the present disclosure is to provide an intercepting device for safely and efficiently intercepting vehicles and controlling drivers.

The disclosed intercepting device provides efficient and safe interceptions of vehicles and controls of drivers by establishing communications between the drivers and the law enforcement personnel without requiring the law enforcement personnel to be in close contact to the drivers and/or the vehicles.

In one non-limiting illustrative example, a device to intercept a vehicle is presented. The device includes a chassis, a pair of brackets mounted on the chassis that provides attachment and detachment to a law enforcement vehicle, a power train assembly mounted on the chassis that provides mobility between the law enforcement vehicle and a target vehicle of the driver, an arm mounted on the chassis and articulable between a contracted position and a deployed position, wherein in the contracted position, the arm lays on the chassis and, in the deployed position, the arm reaches the driver, a head assembly mounted on the arm assembly, the head assembly including a camera that provides output image signals commensurate with images of the driver, a microphone that provides output sound signals commensurate with sounds of the driver, and a scanner that provides output scan signals commensurate with digitalized images of driver documents, and an electronic control unit operatively coupled to the pair of brackets, the arm, assembly, and the head assembly, and configured to send actuation signals to the arm to articulate the arm from the contracted position to the deployed position, receive the output image signals, the output sound signals, and the output scan signals, and transmit the output image signals, the output sound signals, and the output scan signals to a law enforcement electronic device.

In another non-limiting illustrative example, a device to intercept a vehicle is presented. The device includes a chassis, an arm mounted on the chassis and articulable between a contracted position and a deployed position, wherein in the contracted position, the arm lays on the chassis and, in the deployed position, the arm reaches the driver, a head assembly mounted on the arm assembly, the head assembly including a camera that provides output image signals commensurate with images of the driver, a microphone that provides output sound signals commensurate with sounds of the driver, and a scanner that provides output scan signals commensurate with digitalized images of driver documents, and an electronic control unit operatively coupled to the pair of brackets, the arm assembly, and the head assembly, and configured to send actuation signals to the arm to articulate the arm from the contracted position to the deployed position, receive the output image signals, the output sound signals, and the output scan signals, and transmit the output image signals, the output sound signals, and the output scan signals to a law enforcement electronic device.

In another non-limiting illustrative example, a device to intercept a vehicle is presented. The device to intercept a vehicle includes a chassis, an arm mounted on the chassis and articulable between a contracted position and a deployed position, wherein in the contracted position the arm lay on the chassis and in the deployed position the arm reached the driver, and a head assembly mounted on the arm assembly, the head assembly including a camera that provides output image signals commensurate with images of the driver, a microphone that provides output sound signals commensurate with sounds of the driver, and a scanner that provides output scan signals commensurate with digitalized images of driver documents.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a schematic view of a hardware diagram of an electronic control unit for operating the drafting apparatus, according to certain aspects of the disclosure.

DETAILED DESCRIPTION

Figure 1A:
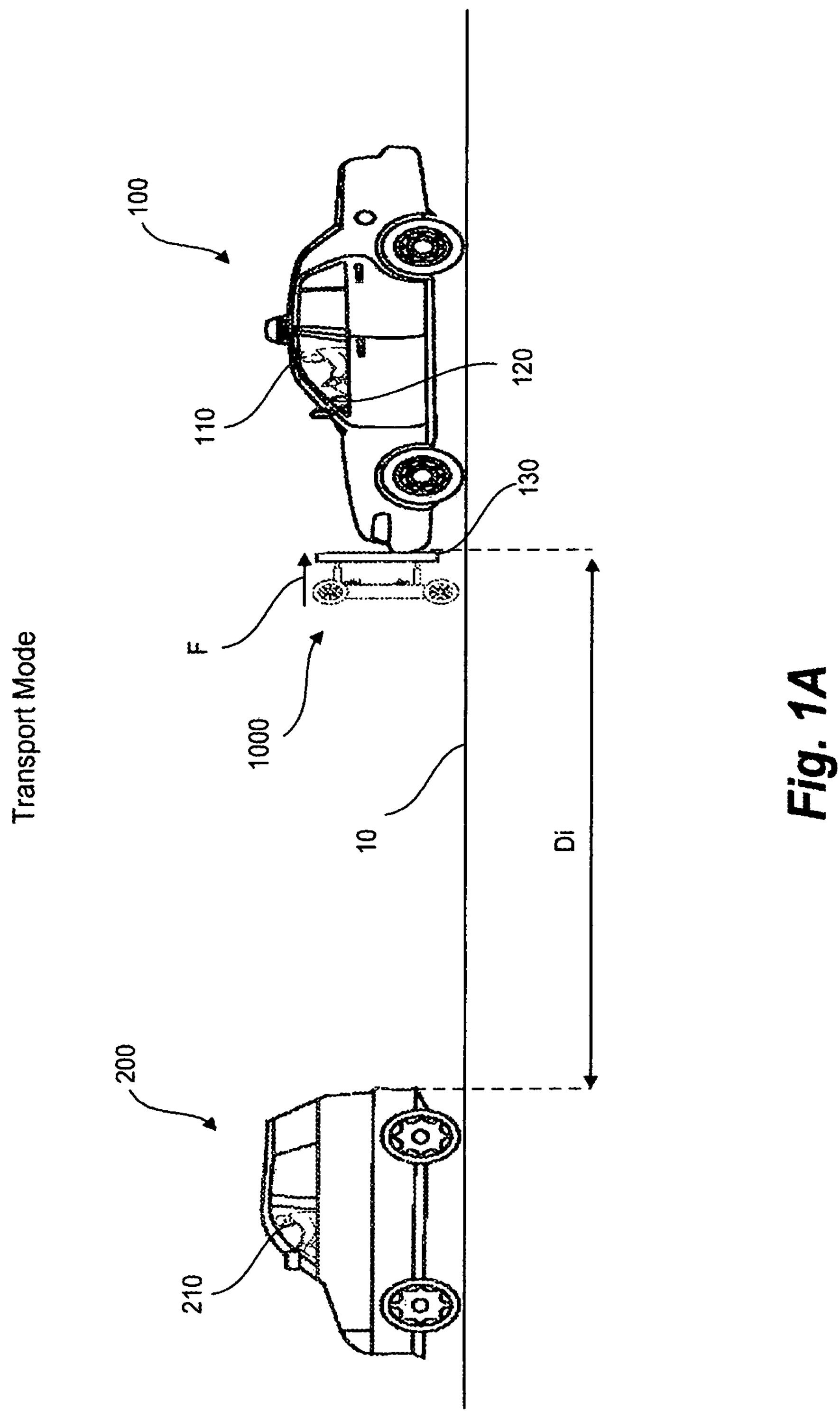
FIG. 1A is a side view of a intercepting device in a transportation mode, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating, schematic structures or flowcharts.

Figure 1B:
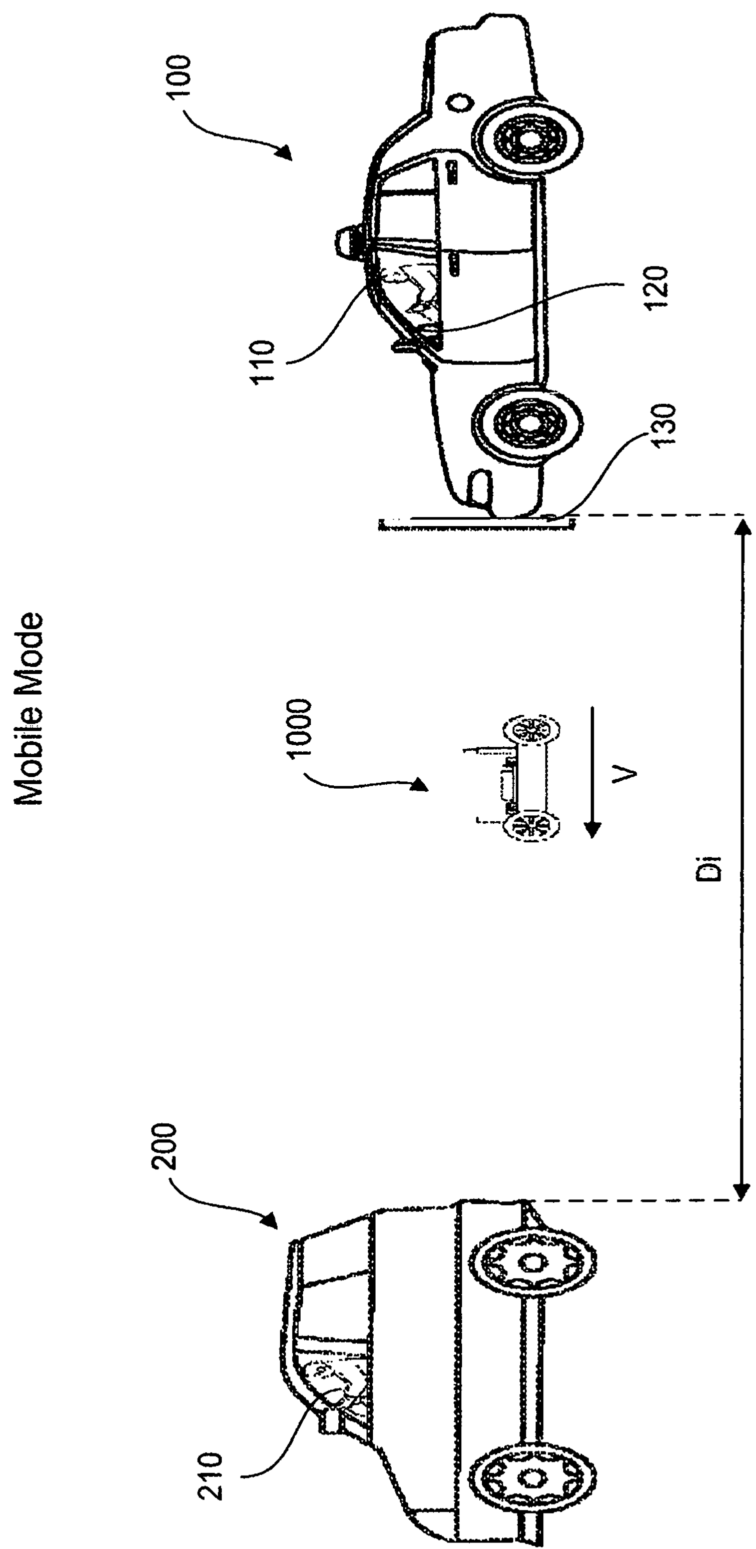
FIG. 1B is a side view of the intercepting device in a mobile mode, according to certain aspects of the disclosure.
Figure 1C:
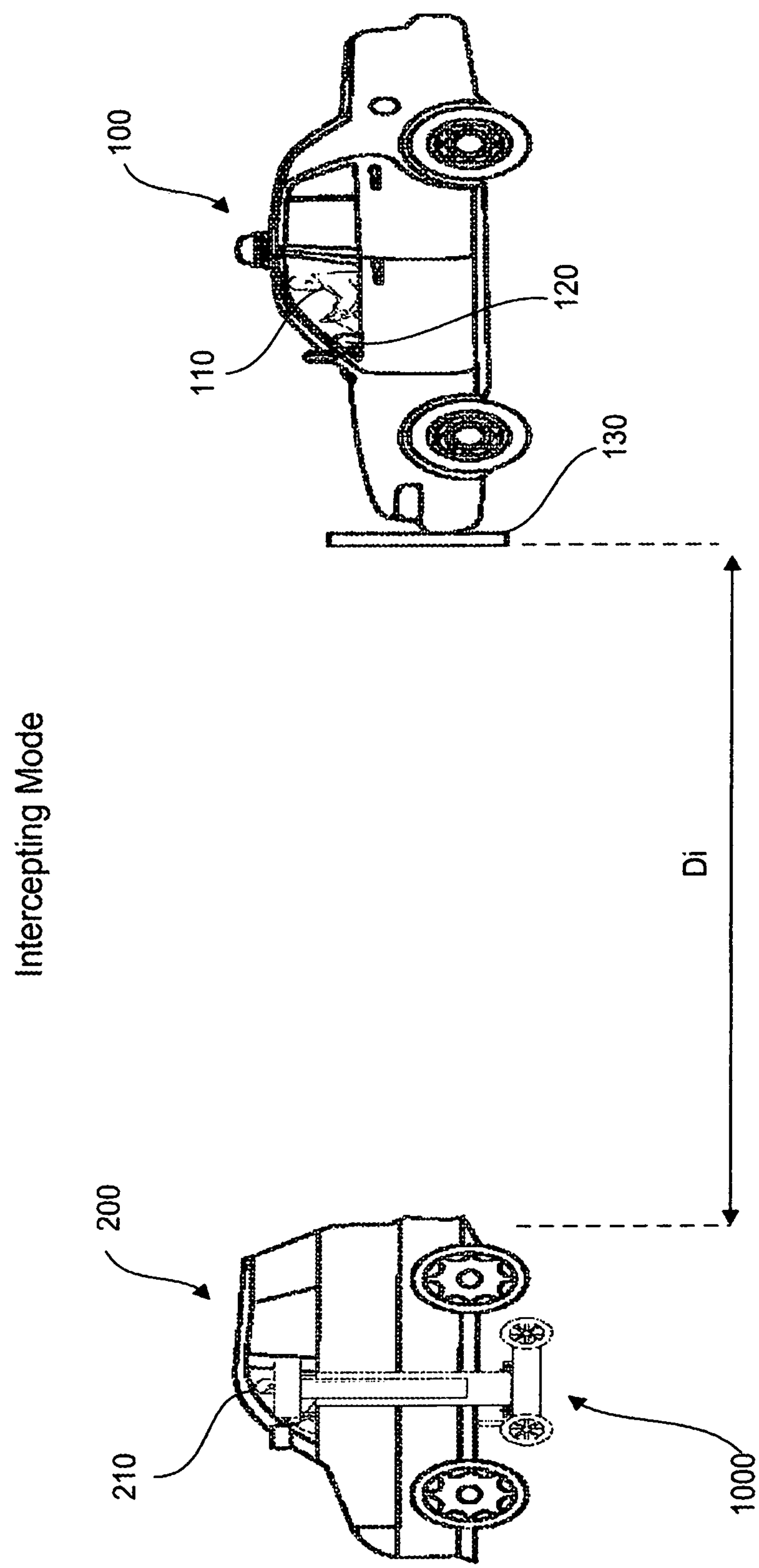
FIG. 1C is a side view of the intercepting device in an interception mode, according to certain aspects of the disclosure.

FIGS. 1A-1C is a side view of a intercepting device 1000 in a transportation mode, a mobile mode, and an interception mode, according to certain aspects of the disclosure;

The intercepting device 1000 provides interception of a target vehicle 200 from a law enforcement vehicle 100, e.g. a police car, without putting a law enforcement personnel 110 into danger.

In addition, the intercepting device 1000 provide a way to rapidly reach the target vehicle 200 in busy and/or dense traffic conditions.

The intercepting device 1000 can be placed in a transportation mode, a mobile mode, and an interception mode.

In the transportation mode, the intercepting device is temporally attached and carried by the law enforcement vehicle 100 until the law enforcement vehicle 100 is at a predetermined interception distance Di from the target vehicle 200 or the law enforcement vehicle 100 cannot come closer to the target vehicle 200 due to traffic or other obstacles, e.g. parked vehicles.

In the mobile mode, the intercepting device 1000 has been detached from the law enforcement vehicle 100 and is in contact with a road surface 10 to roll on the road surface and displace towards the target vehicle 200 through traffic and below the obstacles.

In the interception mode, the intercepting device 1000 reaches the target vehicle 200 and faces a driver 210 of the target vehicle 200 to establish communication between the driver 210 and the law enforcement personnel 110.

The law enforcement vehicle 100 can be equipped with a law enforcement electronic device 120 operatively coupled to the electronic control unit F-1000 through a network F-1024 to send, receive, and display operational data and/or signals from and to the intercepting device 1000.

The electronic device D-1600 can be a computer, a laptop, a smartphone, a tablet, or the like that can be used by law enforcement personnel to store and display the operational data.

FIGS. 2A-2E are a top view of the intercepting device 1000, a front view of the intercepting device 1000 with the arm assembly C-1000 in a retracted position, a front view of the intercepting device 1000 with the arm assembly C-1000 in a deployed position, a side view of the intercepting device 1000 with the arm assembly C-1000 in a retracted position, and a side view of the intercepting device 1000 with the arm assembly C-1000 in a deployed position according, to certain aspects of the disclosure.

The interception vehicle 1000 can include a chassis assembly A-1000, a power train assembly B-1000 mounted on the chassis assembly A-1000, an arm assembly C-1000 mounted on the chassis assembly A-1000, a head assembly E-1000 mounted on an terminal portion of the arm assembly C-1000, a bracket assembly D-1000 that protrudes upwardly from the chassis assembly A-1000, and an electronic control unit F-1000 mounted on the chassis assembly A-1000.

The chassis assembly A-1000 can support the power train assembly B-1000, the arm assembly C-1000, the bracket assembly D-1000 and the electronic control unit F-1000. The chassis assembly A-1000 can have geometrical and dimensional characteristics sufficiently small to be transported by on a front portion, e.g. a push bar bumper 130 as illustrated in FIGS. 1A-1C, of the law enforcement vehicle 100 and sufficiently large to partially or totally encapsulate at least one of the power train assembly B-1000 and/or the electronic control unit F-1000. The chassis assembly can be characterized by a rectangular shape with a predetermined chassis length Lc smaller than an average width of a vehicle and with a predetermined chassis width Wc smaller than an average height of a vehicle. For example, the predetermined chassis length Lc can be between 0.50 m and 4.00 m, and preferably between 1.00 m and 2.00 m, and the predetermined chassis width Wc can be between 0.25 m and 1.50 m, and preferably between 0.50 m and 1.00 m.

The power train assembly B-1000 provides mobility for the intercepting device 1000 and enables the intercepting device 1000 to reach the target vehicle 200 while the law enforcement vehicle 100 is stopped.

The arm assembly C-1000 can be articulated between an contracted position and a extended position, wherein in the contracted position the arm assembly C-1000 maintain the head assembly E-1000 against the chassis assembly A-1000 while in the deployed position the arm assembly maintains the head assembly E-1000 at a height of the driver 210 of the target vehicle 200.

The head assembly E-1000 can provide communications between the driver 210 of the target vehicle 200 and the law enforcement personnel 110 by capturing driver information K from the driver 210 and emitting law enforcement information from the law enforcement personnel 110. The driver information K can be visual and audio information such as images and/or voices of the driver 210 while the law enforcement information can be audio and/or visual instructions and/or questions given and/or ask by the law enforcement personnel 110 while the driver information K can be audio and/or visual answers and/or actions following the instruction of the law enforcement personnel 110.

The bracket assembly D-1000 can provide attachment and detachment between the intercepting device 1000 and the law enforcement vehicle 100 in order for the intercepting vehicle to transfer from the transport mode to the mobile mode.

In addition, the bracket assembly D-1000 can provide ergonomic structures to manually carry the intercepting device 1000.

The electronic control unit F-1000 is operatively linked to the different elements of the intercepting device 1000 to manage and operate the different elements of the intercepting device 1000 such as the power train assembly B-1000, the arm assembly C-1000, and/or the electronic control unit F-1000.

The power train assembly B-1000 can include a driving motor B-1100 operatively linked to the electronic control unit F-1000, a pair of driving wheels B-1200 positioned on a first lateral chassis portion of the chassis assembly A-1000, a propeller shaft mechanism B-1300 connecting the driving motor B-1100 to the pair of driving wheels B-1200, a pair of steering wheels B-1400 positioned on a second lateral chassis portion of the chassis assembly A-1000 opposite to the first lateral chassis portion, a steering motor B-1500 operatively connected to the electronic control unit F-1000, and a rack and pinion mechanism B-1600 connecting the pair of steering wheels B-1400 to the steering motor B-1500.

The driving motor B-1100 can receive propulsion signals Spr, as illustrated in FIG. 4, from the electronic control unit F-1000 and provide rotation motion transmitted to the pair of driving wheels B-1200 through the propeller shaft mechanism B-1200, while the steering, motor B-1500 can receive steering signals Sst, as illustrated in FIG. 4, from the electronic control unit F-1000 and provide steering directions transmitted to the pair of steering wheels B-1400 through the rack and pinion mechanism B-1600.

Figure 2A:
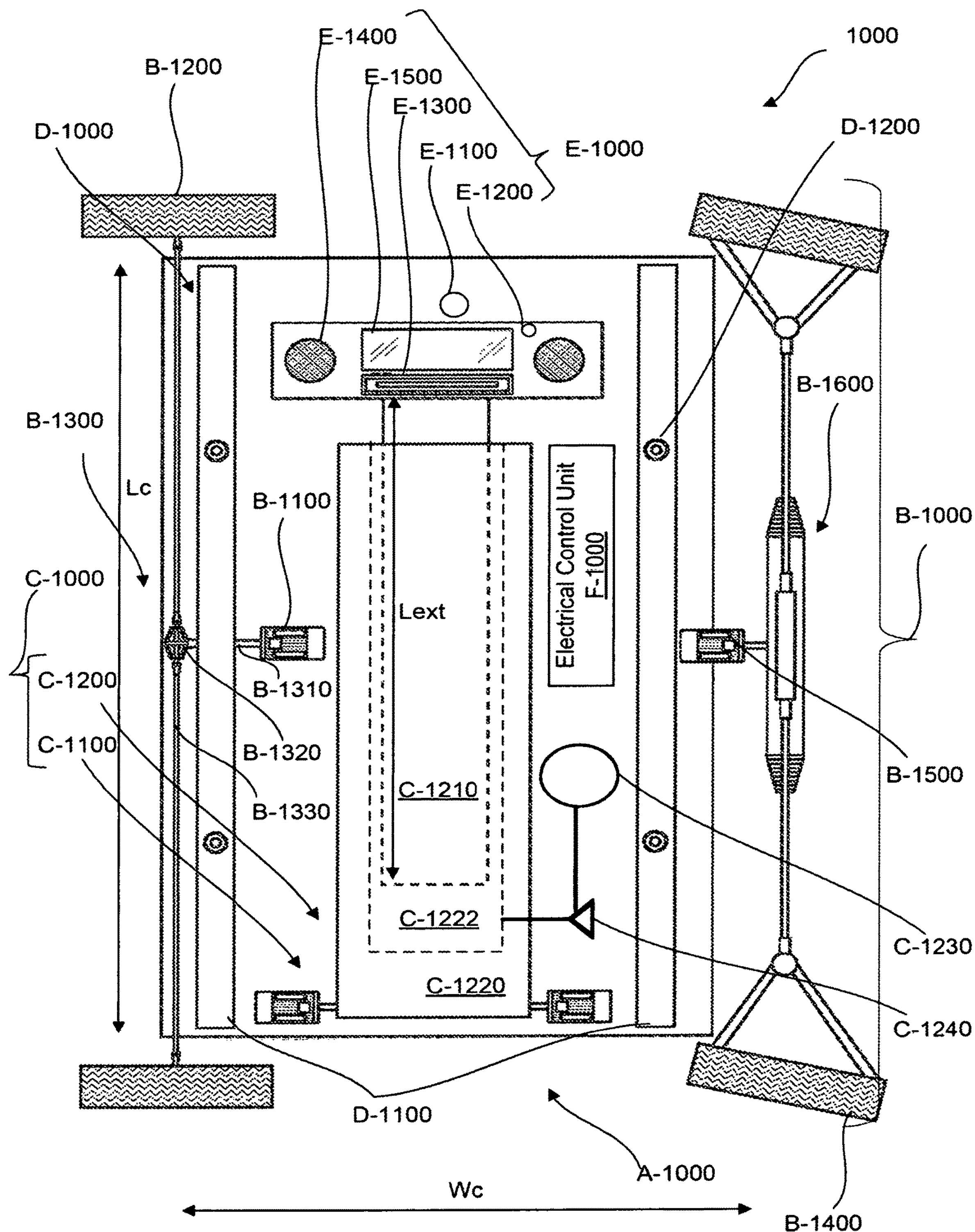
FIG. 2A is a top view of the intercepting, device, according to certain aspects of the disclosure.

The propeller shaft mechanism B-1300 can include a propeller shaft B-1310 connected to the driving motor B-1100, a differential B-1320 connected to the propeller shaft B-1310, and a pair of wheel shafts B-1330 connecting the differential B-1320 to the pair of driving wheels B-1200, as illustrated in FIG. 2A.

Figure 2B:
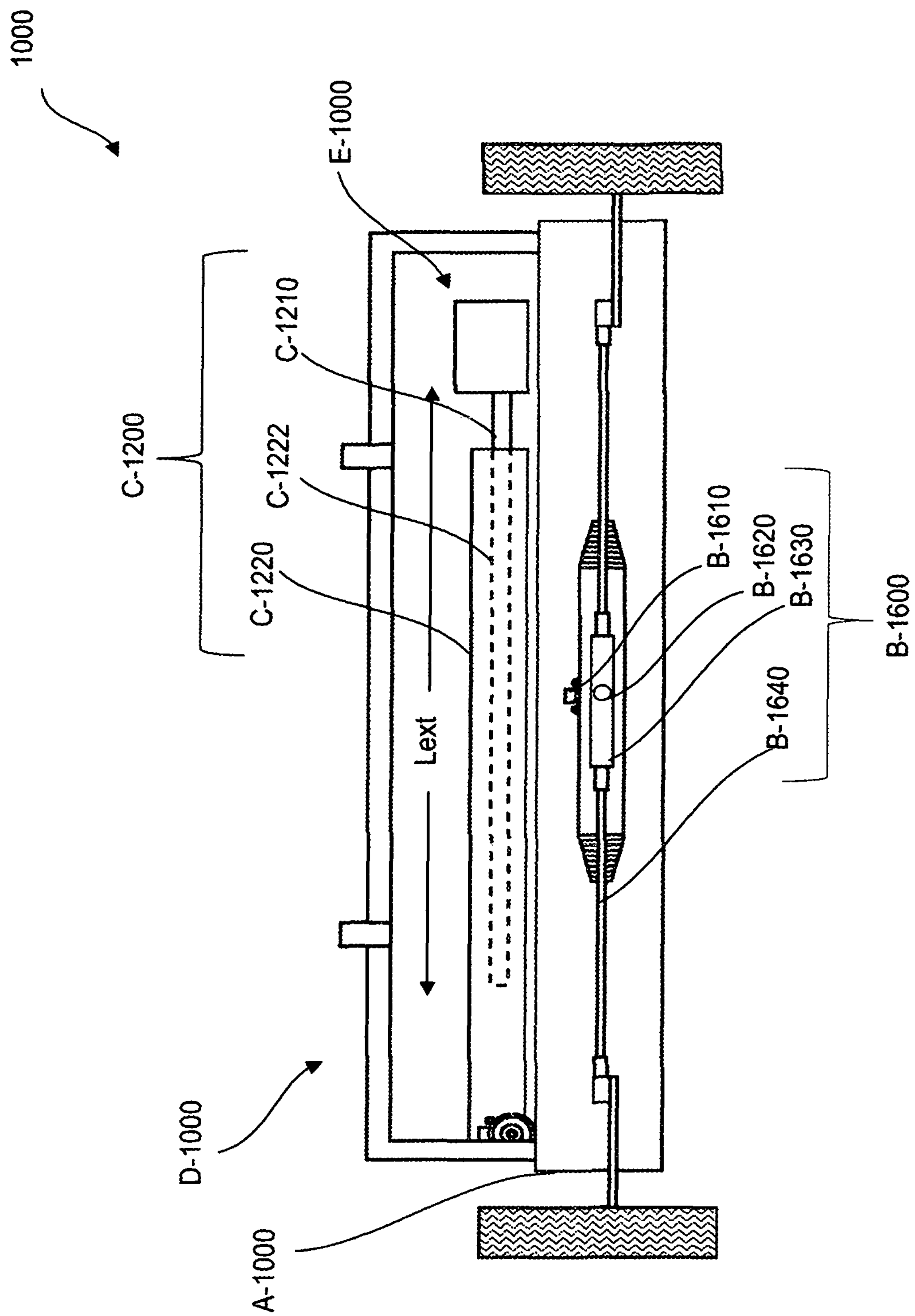
FIG. 2B is a front view of the intercepting device with an arm assembly in a retracted position, according to certain aspects of the disclosure.

The rack and pinion mechanism B-1600 can include a steering column B-1610 connected to the steering motor B-1500, a pinion B-1620 connected to the steering column B-1610, a rack B-1630 engaged by the pinion B-1620, and a pair of tie rods B-1640 connecting the rack B-1630 to the pair of steering wheels B-1400, as illustrated in FIG. 2B.

The bracket assembly D-1000 can include a pair of brackets D-1100 extending along the predetermined chassis length Lc and protruding upwardly from the chassis assembly A-1000 with a predetermined bracket height Hbr, and a pair of electromagnets D-1200 positioned on each bracket of the pair of brackets D-1100 and operatively connected to the electronic control unit F-1000.

The pair of electromagnets D-1200 can provide attachment of the intercepting device 1000 to the law enforcement vehicle 100 for the transport mode and detachment of the intercepting device 1000 from the law enforcement vehicle 100 from transferring from the transport mode to the displacement mode.

To place the intercepting device 1000 in the transport mode, the pair of electromagnets D-1200 can receive from the electronic control unit F-1000 magnet activation signals Smag, as illustrated in FIG. 4, to generate between the intercepting device 1000 and the law enforcement vehicle a predetermined magnetic force F to maintain the intercepting device 1000 affixed against a ferrous portion of the law enforcement vehicle 100, e.g. a push bar bumper 130 as illustrated in FIG. 1A, the body, or the like, and prevent the intercepting device 1000 from contacting the road surface 10.

To transition the intercepting device 1000 from the transport mode to the displacement mode, the pair of electromagnets D-1200 can receive from the electronic control unit F-1000 magnet deactivation signals DSmag, as illustrated in FIG. 4, to stop the predetermined magnetic force F and drop the intercepting device 1000 on the road surface 10.

The predetermined bracket height Hbr is sufficiently large to have the pair of electromagnets D-1200 positioned above the pair of steering wheels B-1400 and the pair of driving wheels B-1200 and sufficiently small to prevent the pair of brackets D-1100 from contacting undercarriages when the intercepting device 1000 goes below the vehicles. For example, the bracket height Hbr can be between 0.10 m and 0.50 m, and preferably between 0.15 m and 0.30 m.

The arm assembly C-1000 can include a motorized pivot C-1100 affixed to the chassis assembly A-1000 and operatively linked to the electronic control unit F-1000, a telescopic arm C-1200 extending between the motorized pivot C-1100 and the head assembly E-1000 and operatively link to the electronic control unit F-1000.

The telescopic arm C-1200 can include an inner arm C-1210 with a first terminal portion affixed to the head assembly E-1000, an outer arm C-1220 with a first terminal portion affixed to the motorized pivot C-1100 and an inner portion C-1222 to receive a length of the inner arm C-1210, a hydraulic reservoir C-1230 that contains an hydraulic fluid, e.g. water, air, and/or oil, and in communication with the inner portion C-1222, and a pump C-1240 placed between the hydraulic reservoir C-1230 and the inner portion C-1222.

Figure 2C:
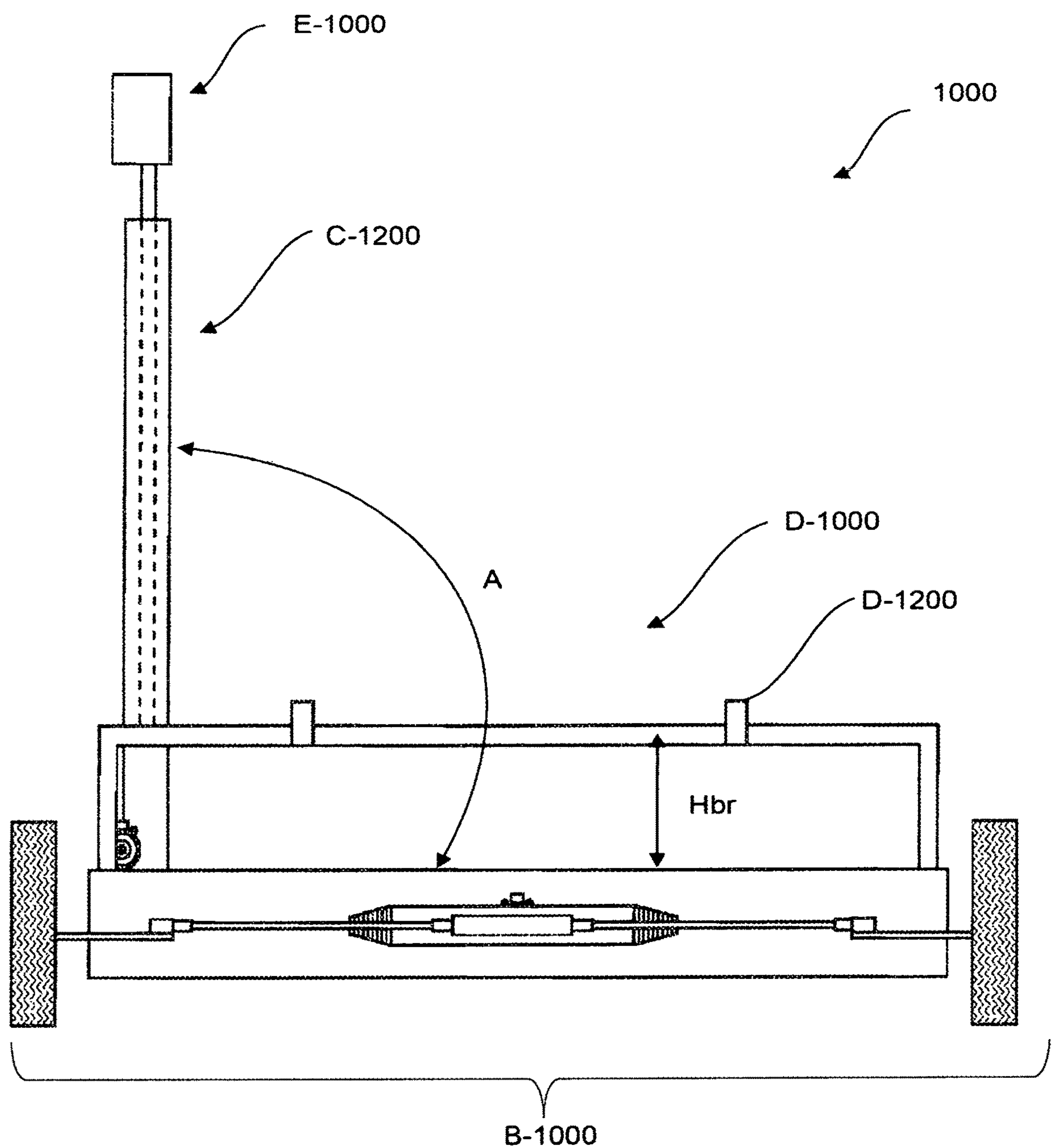
FIG. 2C is a front view of the intercepting device with the arm assembly in a deployed position, according to certain aspects of the disclosure.
Figure 2D:
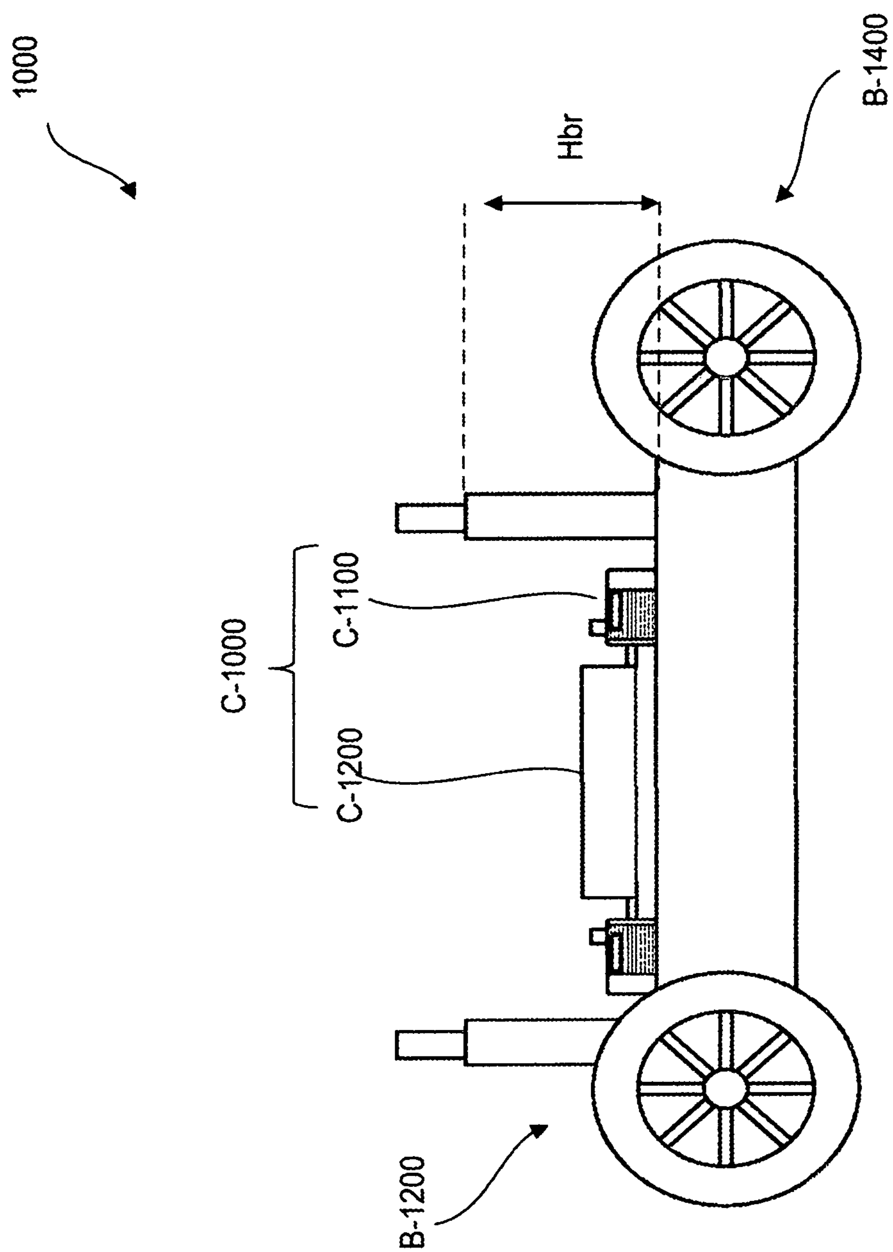
FIG. 2D is a side view of the intercepting device with the arm assembly in the retracted position, according to certain aspects of the disclosure.
Figure 2E:
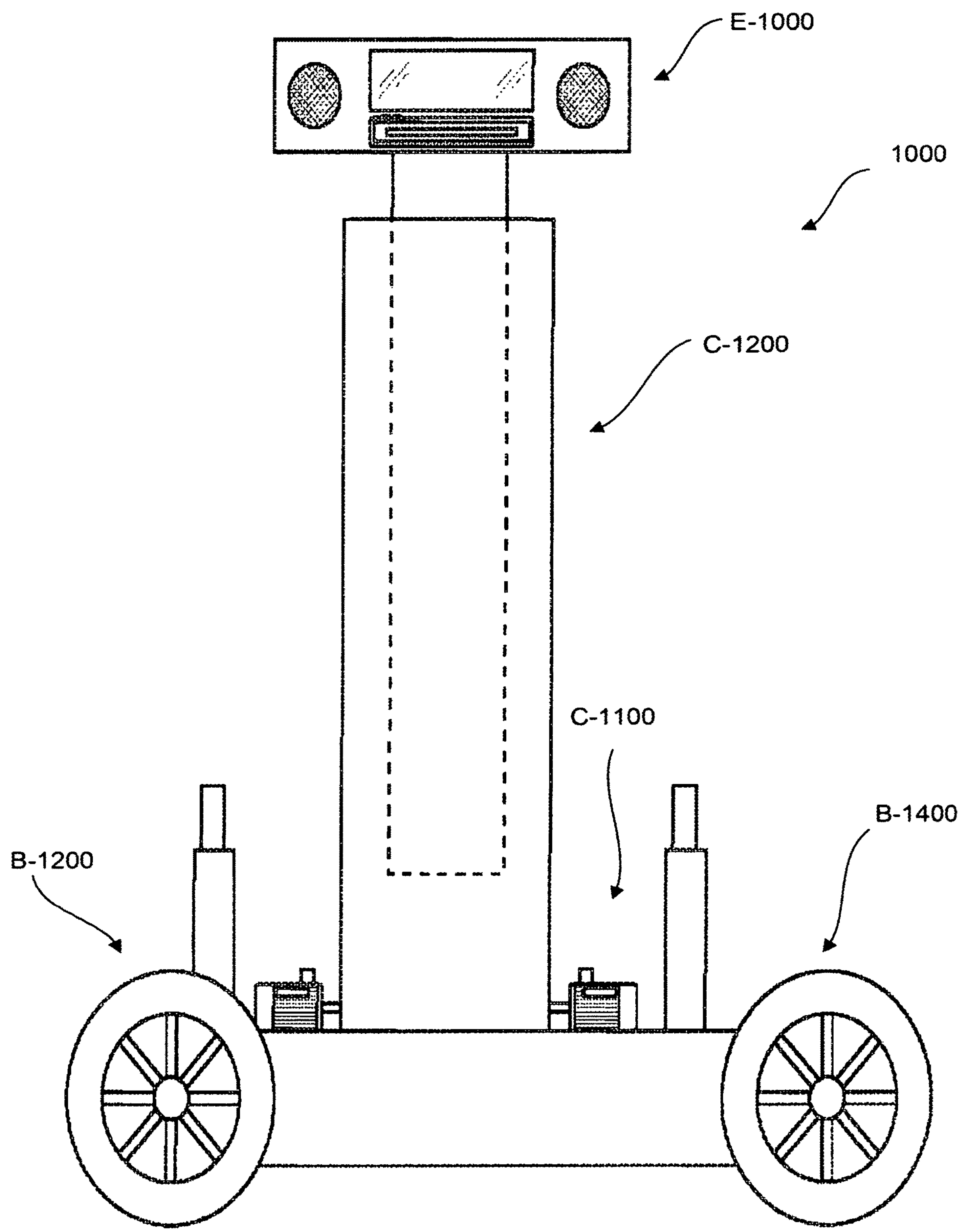
FIG. 2E is a side view of the intercepting device with the arm assembly in the deployed position, according to certain aspects of the disclosure.

To articulate the arm assembly C-1000 from the contracted position, as illustrated in FIGS. 2A, 2C, to the deployed position, as illustrated in FIGS. 2B, 2D, the motorized pivot C-1100 can receive rotation signals Sr, as illustrated in FIG. 4, from the electronic control unit F-1000 to rotate the telescopic arm c-1200 in a first direction, e.g. counter-clock wise, by a predetermined angle A and the pump C-1240 can receive pump signals Spu, as illustrated in FIG. 4, from the electronic control unit F-1000 to transfer the hydraulic fluid from the hydraulic reservoir C-1230 to the inner portion C-1222 and extend the inner arm C-1210 along the outer arm C-1220 by a predetermined extension length Lext.

To articulate the arm assembly C-1000 from the deployed position, as illustrated in FIGS. 2B, 2D, to the contracted position, as illustrated in FIGS. 2A, 2C, the motorized pivot C-1100 can receive rotation signals Sr, as illustrated in FIG. 4, from the electronic control unit F-1000 to rotate the telescopic arm C-1200 in a second direction opposite to the first direction, e.g. clock wise, by the predetermined angle A and the pump C-1240 can receive pump signals Spu, as illustrated in FIG. 4, from the electronic control unit F-1000 to transfer the hydraulic fluid from the inner portion C-1222 to hydraulic reservoir C-1230 to and retract the inner arm C-1210 along the outer arm C-1220 by the predetermined extension length Lext.

The predetermined angle A and the predetermined extension length Lext can be sufficiently large to have the head assembly E-1000 facing the driver 210 of the target vehicle 200 when the arm assembly is articulated in the deployed position and sufficiently small to have the head assembly E-1000 and the arm assembly C-1000 not protruding from the chassis assembly A-1000 when the arm assembly is articulated in the contracted position. For example, the predetermined angle A can be between 70° and 110°, and preferably between and 85° and 95°, while the predetermined extension length Lext can be between 0.10 m and 1.50 m, and preferably between 0.25 m and 1.00 m.

The head assembly E-1000 can include a camera E-1100, a microphone E-1200, a scanner E-1300, a screen E-1500, and a pair of speakers E-1400 operatively linked to the electronic control unit F-1000.

The camera E-1100 can provide to the electronic control unit F-1000 output image signals Simo, as illustrated in FIG. 4, commensurate with images of the driver 210 and/or the target vehicle 200, the microphone E-1200 can provide output sound signals Ss, as illustrated in FIG. 4, commensurate with sound and/or voice from the driver 210, the scanner E-1300 can provide to the electronic control unit F-1000 output scan signals Ssco, as illustrated in FIG. 4, commensurate with digitalized images of driver documents, e.g. driving license, insurance documents, or the like, the screen E-1500 can receive from the electronic control unit F-1000 input image signals Simin, as illustrated in FIG. 4, commensurate with images from the law enforcement personnel 110, the speaker can receive input sound signals Ssin, as illustrated in FIG. 4, commensurate with sound and/or voice emitted by the law enforcement personnel 110.

To increase the maneuverability of the intercepting device 1000 a supplementary rack and pinion mechanism, similar to the rack and pinion mechanism B-1500, can be mounted onto the pair of driving wheels B-1100 and be actuated independently from the rack and pinion mechanism B-1500 that steers the pair of steering wheels B-1300 by the electronic control unit F-1000. The independent actuation of the supplementary rack and pinion mechanism can further increase the maneuverability of the intercepting device 1000 by reducing the steering radius of the intercepting device 1000.

To further increase the maneuverability of the intercepting device 1000 each wheel of the pair of steering wheels B-1300 and the pair of driving wheels B-1100 can be connected to an electrical motor independently actuated by the electronic control unit F-1000.

Figure 3:
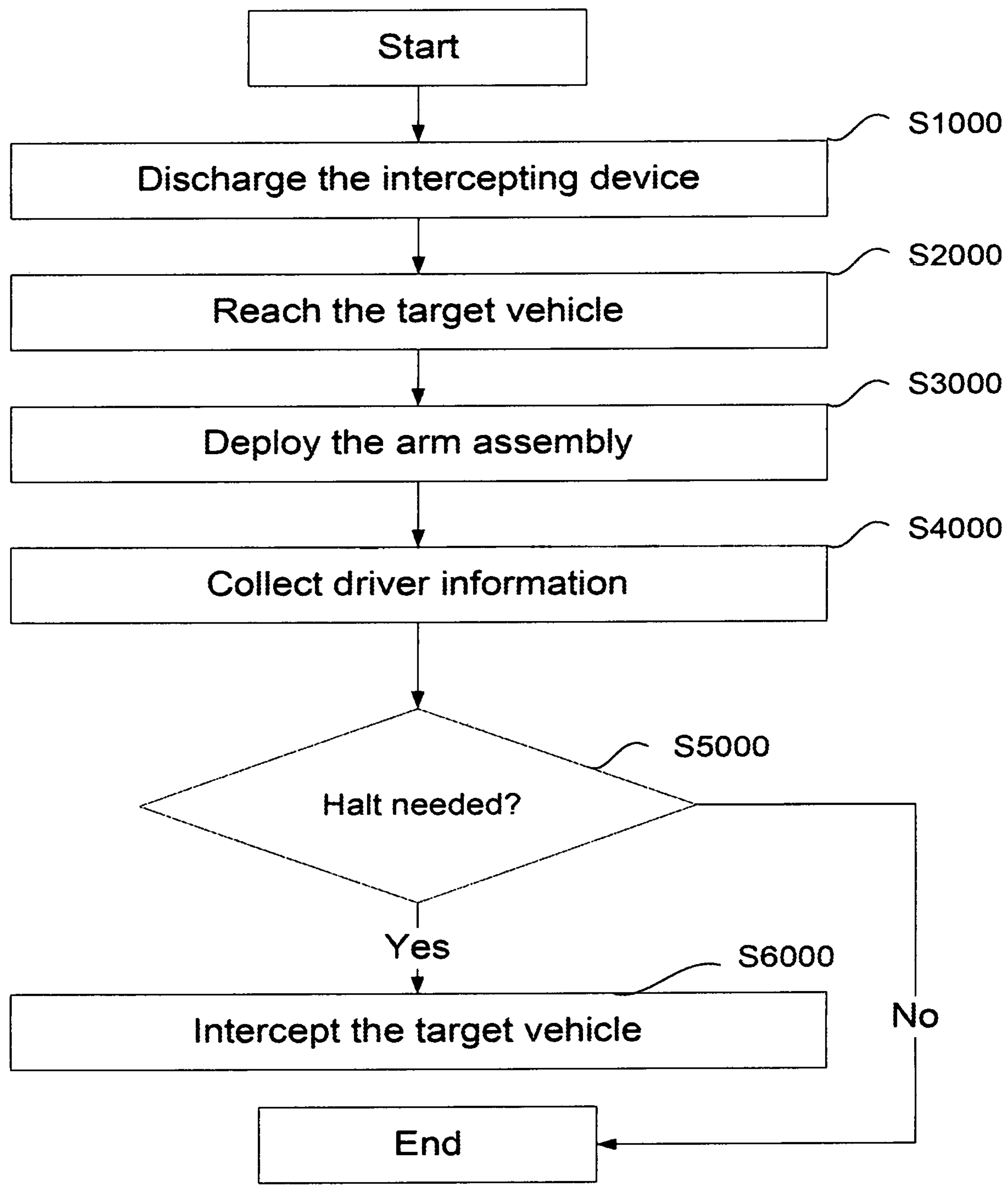
FIG. 3 is a flowchart of a method to intercept a target vehicle with the intercepting device, according to certain aspects of the disclosure.

FIG. 3 is a flowchart of a method to intercept a target vehicle 200 with the intercepting device 1000, according to certain aspects of the disclosure.

In a step S1000, the intercepting device 1000 is discharged from the law enforcement vehicle 100. Under the action of the law enforcement personnel 110 on the law enforcement electronic device 120 and through the network F-1024, the electronic control unit F-1000 can send to the pair of electromagnets D-1200 the deactivation signals DSmag, as illustrated in FIG. 4, to stop the predetermined magnetic force F between the intercepting device 1000 and the law enforcement vehicle 100 and discharge the intercepting device 1000 on the road surface 10.

In a step S2000, the intercepting device 1000 can be displaced by the law enforcement personnel 110 to reach the target vehicle 200. The displacement of the intercepting device 1000 to reach the target vehicle 200 can performed by the law enforcement personnel 110 via software instructions executed on a processor F-1002 of the electronic control unit F-1000 following input data entered via a keyboard and/or joystick of the law enforcement electronic device 120 and transmitted to the electronic control unit F-1000 via the network F-1024. For example, the electronic control unit F-1000 can send to the driving motor B-1100 propulsion signals Spr, as illustrated in FIG. 4, commensurate to a displacement speed V, as illustrated in FIG. 1B, of the intercepting device 1000 and to the steering motor steering signals Sst, as illustrated in FIG. 4, commensurate with a steering direction and/or angle of the pair of steering wheels B-1400 wherein the displacement speed V and the steering direction and/or angle are entered by the law enforcement personal via the keyboard and/or joystick of the law enforcement electronic device 120.

In a step S3000, the arm assembly C-1000 of the intercepting device 1000 can be articulated from the contracted position to the deployed position. The articulation of the arm assembly C-1000 can performed by the law enforcement personnel 110 via software instructions executed on the processor F-1002 of the electronic control unit F-1000 following input data entered via the keyboard and/or joystick of the law enforcement electronic device 120. For example, the electronic control unit F-1000 can send to the motorized pivot C-1100 rotation signals Sr, as illustrated in FIG. 4, commensurate with an angle A between the outer arm C-1220 of the arm assembly C-1000 and the chassis assembly A-1000 and pump signals Spu, as illustrated in FIG. 4, to the pump C-1240 of the arm assembly C-1000 commensurate with an extension length Lext of the arm assembly C-1000 wherein the angle A and the extension length Lext are entered by the law enforcement personal via the keyboard and/or joystick of the law enforcement electronic device 120.

In a step S4000, driver information K, as illustrated in FIG. 4, is collected. The driver information K can include images of the driver 210, e.g. facial images, and/or the target vehicle 200, license plate images, responses of the driver 210 to questions from the law enforcement personnel 110, digitalized images of the driver documents, driving license, insurance documents, or the like.

The collection of driver information K can be performed through the head assembly E-1000 and software instructions executed on the electronic control unit F-1000.

For example, the electronic control unit F-1000 and software instructions can be configured to receive output image signals Simo, as illustrated in FIG. 4, commensurate with images of the driver 210 and/or the target vehicle 200 from the camera E-1100, output sound signals Ss, as illustrated in FIG. 4, commensurate with responses to law enforcement personal questions and/or orders from the microphone, output scan signals Ssco, as illustrated in FIG. 4, commensurate with digitalized images of driver documents from the scanner E-1300.

In a step S5000, it is determined if the driver 210 need to be halted. The determination that the driver 210 needs be arrested can be performed through software instructions executed on the electronic control unit F-1000.

For example, the electronic control unit F-1000 can be configured to analyze and verify the driver information K and make sure that the driver 210 and/or the target vehicle 200 is not under a felony charge, a misdemeanor, charge, and/or an infraction.

The electronic control unit F-1000 can be further configured to access via the network F-1024 a law enforcement data base, e.g. police record, criminal record, department of motor vehicles record, or any other administrative record, and performed searches on the law enforcement data base.

If it is determined that the driver 210 and/or the target vehicle needs to be halted the process goes to a step S6000. Otherwise the process stops.

In the step S6000, the target vehicle 200 is halted. The halt of the target vehicle 200 can be performed by the law enforcement personnel 110 via software instructions executed on the electronic control unit F-1000. For example, the electronic control unit F-1000 can be configured to send to the pair of speakers E-1400 alert signals commensurate with alert and/or order messages to stop the target vehicle 200.

In addition, the electronic control unit F-1000 can be configured to send the action signals Smagn to the pair of electromagnets D-1200, as illustrated in FIG. 4, to affix the intercepting device 1000 to the target vehicle 200.

FIG. 4 is a schematic view of a hardware diagram of an electronic control unit for operating the drafting apparatus, according to certain aspects of the disclosure.

FIG. 4 depicts the electronic control unit F-1000 to control the apparatus to draft a patent application. As shown in FIG. 4, systems, operations, and processes in accordance with this disclosure may be implemented using the processor F-1002 or at least one application specific processor (ASP). The processor F-1002 may utilize a computer readable storage medium, such as a memory F-1204 (e.g., ROM, EPROM, EEPROM, flash memory, static memory, DRAM, SDRAM, and their equivalents), configured to control the processor F-1002 to perform and/or control the systems, operations, and processes of this disclosure. Other storage mediums may be controlled via a disk controller F-1006, which may control a hard disk drive F-1008 or optical disk drive F-1010.

The processor F-1002 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor F-1002 may be a separate device or a single processing mechanism. Further, this disclosure may benefit form parallel processing capabilities of a multi-cored processor.

In another aspect, results of processing in accordance with this disclosure may be displayed via a display controller F-1012 to a monitor F-1014 that may be peripheral to or part of the electronic control unit F-1000. Moreover, the monitor F-1014 may be provided with a touch-sensitive interface to a command/instruction interface. The display controller F-1012 may also include at least one graphic processing unit for improved computational efficiency. Additionally, the electronic control unit F-1000 may include an I/O (input/output) interface F-1016, provided for inputting sensor data from sensors F-1018 and for outputting orders to actuators F-1022. The sensors F-1018 and actuators F-1022 are illustrative of any of the sensors and actuators described in this disclosure. For example, the sensors F-1018 can include the camera E-1100, the microphone E-1200, and/or the scanner E-1300 while the actuators F-1022 can include the screen E-1500, the pair of speakers E-1400, the driving motor B-1100, the steering motor B-1500, the pump C-1240, the electromagnets D-1200, the motorized pivot C-1100.

Further, other input devices may be connected to an I/O interface F-1016 as peripherals or as part of the controller F-1000. For example, a keyboard or a pointing device such as a mouse F-1020 may control parameters of the various processes and algorithms of this disclosure, and may be connected to the I/O interface F-1016 to provide additional functionality and configuration options, or to control display characteristics. Actuators F-1022 which may be embodied in any of the elements of the apparatuses described in this disclosure may also be connected to the I/O interface F-1016.

The above-noted hardware components may be coupled to the network F-1024, such as the Internet or a local intranet, via a network interface F-1026 for the transmission or reception of data, including controllable parameters to a mobile device. A central BUS F-1028 may be provided to connect the above-noted hardware components together, and to provide at least one path for digital communication there between.

Figure 5:
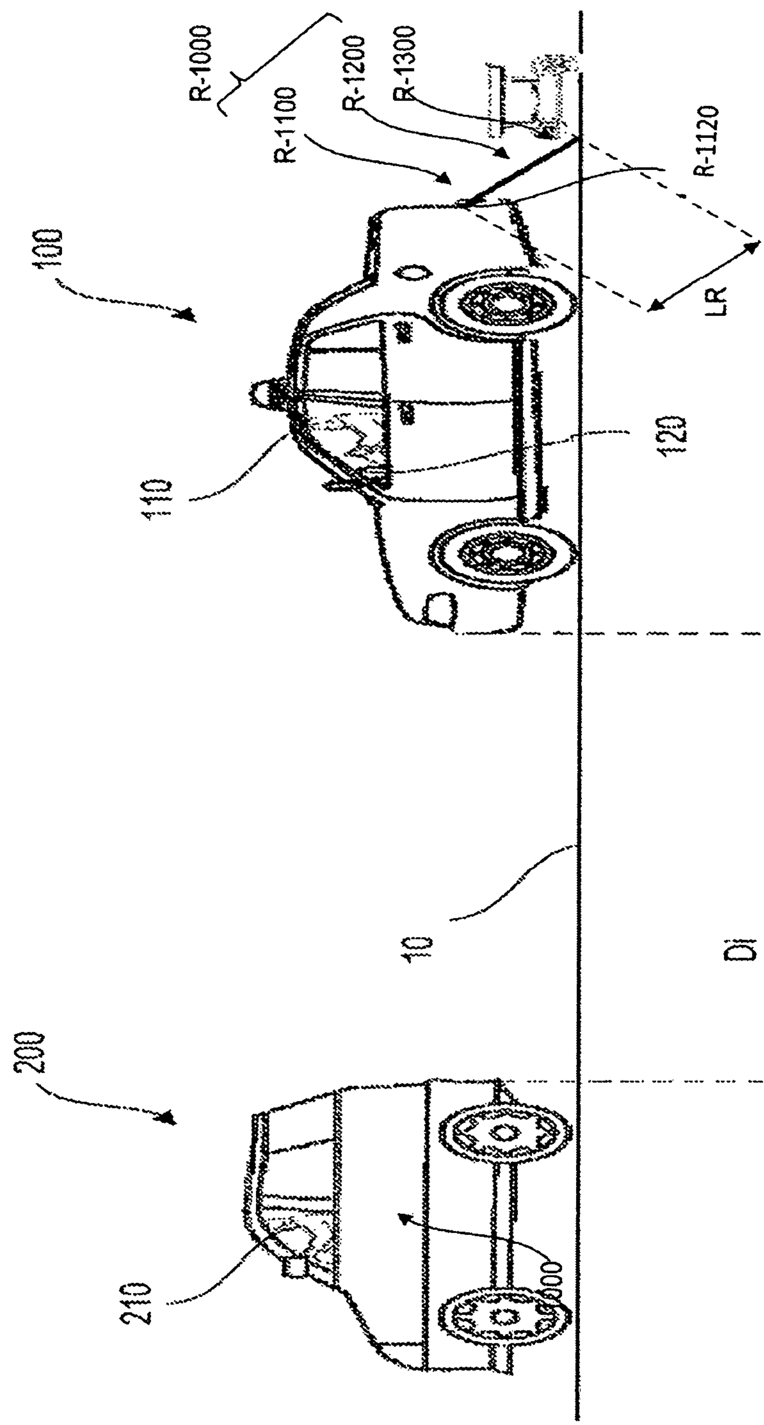
FIG. 5 is a side view of the intercepting device with a ramp, according to certain aspects of the disclosure.

FIG. 5 is a side view of the intercepting device 1000 with a ramp R-1000, according to certain aspects of the disclosure.

The intercepting device 1000 can include a ramp R-1000 that provides access for the intercepting device 1000 between the law enforcement vehicle 100 and the road surface 10. The ramp R-1000 can include a first terminal end R-1100 that can be temporally attached to a storage compartment 120 of the law enforcement vehicle 100, e.g a trunk, a second terminal end R-1300 that can sit on the road surface 10, and a ramp body R-1200 extending between the first terminal end R-1100 and the second terminal end R-1300.

The ramp body R-1200 can have a predetermined ramp length LR sufficiently long to allow the intercepting device 1000 to climb on the ramp R-1000 but sufficiently small to allow the ramp R-1000 to fit into the storage compartment 120 of the law enforcement vehicle 100. For example LR can be between 5.00 m and 0.50 m, and preferably between 1.00 m and 2.00 m.

The first terminal end R-1100 of the ramp R-1000 can include a plurality of electromagnets R-1120 that can be activated and deactivated by the electronic control unit F-1000 to provide temporal attachment between the law enforcement vehicle 100 and the ramp R-1000.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. An intercepting device to inspect a driver of a target vehicle, the intercepting device comprising:

a chassis;

a pair of brackets mounted on the chassis, where each bracket includes a pair of electromagnets that provides attachment and detachment to a law enforcement vehicle;

a power train assembly mounted on the chassis that provides mobility between the law enforcement vehicle and the target vehicle;

an arm mounted on the chassis and articulable between a contracted position and a deployed position;

a head assembly mounted on the arm, the head assembly including:

a camera configured to provide output image signals commensurate with images of the driver, and a microphone configured to provide output sound signals commensurate with sounds of the driver, an electronic control unit operatively coupled to the pair of brackets, the arm, and the head assembly, and configured to send actuation signals to the arm to articulate the arm from the contracted position to the deployed position, wherein in the contracted position, the arm lays on the chassis and, in the deployed position, the arm extends from the chassis to have the head assembly facing the driver, receive the output image signals; and the output sound signals, and transmit the output image signals; and the output sound signals to the law enforcement electronic device wherein the electronic control unit is further configured to send action signals to the pair of electromagnets to affix the intercepting device to the target vehicle based on the output image signals and the output sound signals.

2. The intercepting device of claim 1, wherein the arm further includes an inner arm with a terminal portion affixed to the head assembly, and an outer arm with an inner portion that slidably receives the inner arm.

3. The intercepting device of claim 2, wherein the arm further includes a hydraulic reservoir fluidly connected to the inner portion of the outer arm and a pump positioned between the hydraulic reservoir and the inner portion.

4. The intercepting device of claim 3, wherein the arm further includes a motorized pivot that extends between the chassis and a terminal end of the outer arm and rotates the outer arm to articulate the arm between the contracted position and the deployed position.

5. The intercepting device of claim 1, wherein the pair of electromagnets provides attachment and detachment from a ferrous part of the law enforcement vehicle.

6. The intercepting device of claim 5, wherein the ferrous part is positioned on a push bar bumper portion of the law enforcement vehicle.

7. The intercepting device of claim 1, wherein the power train includes a pair of driving wheels positioned on a first lateral portion of the chassis and protruding partially from the chassis.

8. The intercepting device of claim 7, wherein the power train further includes a pair of steering wheels positioned on a second lateral portion of the chassis opposite to the first lateral portion of the chassis.

9. The intercepting device of claim 1, wherein the electronic control unit is further configured to extract driver information from at least one of the output image signals, and the output sound signals, and check the driver information with a law enforcement data-base.

10. The intercepting device of claim 1, wherein the head further includes a screen to display visual instructions and speakers to diffuse audio instructions to the driver.

11. An intercepting device to inspect a driver of a target vehicle, the intercepting device comprising:

a chassis;

an arm mounted on the chassis and articulable between a contracted position and a deployed position;

a head assembly mounted on the arm, the head assembly including:

a camera configured to provide output image signals commensurate with images of the driver, a microphone configured to provide output sound signals commensurate with sounds of the driver, and an electronic control unit operatively coupled to the pair of brackets, the arm, and the head assembly, and configured to send actuation signals to the arm to articulate the arm from the contracted position to the deployed position, wherein in the contracted position, the arm lays on the chassis and, in the deployed position, the arm extends from the chassis to have the head assembly facing the driver, receive the output image signals; and the output sound signals, and transmit the output image signals and the output sound signals to a law enforcement electronic device;

wherein the electronic control unit is further configured to send action signals to a pair of electromagnets to affix the intercepting device to the target vehicle based on the output image signals and the output sound signals.

12. The intercepting device of claim 11, wherein the arm further includes an inner arm with a terminal portion affixed to the head assembly, and an outer arm with an inner portion that slidably receives the inner arm.

13. The intercepting device of claim 12, wherein the arm further includes a hydraulic reservoir fluidly connected to the inner portion of the outer arm and a pump positioned between the hydraulic reservoir and the inner portion.

14. The intercepting device of claim 13, wherein the arm further includes a motorized pivot that extends between the chassis and a terminal end of the outer arm and rotates the outer arm to articulate the arm between the contracted position and the deployed position.

15. The intercepting device of claim 11, wherein the electronic control unit is further configured to extract driver information from at least one of the output image signals; and the output sound signals, and check the driver information with a law enforcement data-base.

16. The intercepting device of claim 11, wherein the head further includes a screen to display visual instructions.

17. The intercepting device of claim 11, wherein the head further includes speakers to diffuse audio instructions to the driver.

18. The intercepting device of claim 17, wherein the electronic control unit is further configured to send alert signals commensurate with order messages to stop the target vehicle to the speakers based on the output image signals and the output sound signals.

* * * * *